US007599854B1

(12) United States Patent
Baum et al.

(10) Patent No.: US 7,599,854 B1
(45) Date of Patent: Oct. 6, 2009

(54) METHOD AND SYSTEM FOR COLLECTING IMAGES FROM A PLURALITY OF CUSTOMERS

(75) Inventors: Daniel Baum, Menlo Park, CA (US); Avi Bleiweiss, Sunnyvale, CA (US); Xin Wen, Palo Alto, CA (US)

(73) Assignee: Shutterfly, Inc., Redwood City, CA (US)

( * ) Notice: Subject to any disclaimer, the term of this patent is extended or adjusted under 35 U.S.C. 154(b) by 2032 days.

(21) Appl. No.: 09/630,752

(22) Filed: Aug. 2, 2000

(51) Int. Cl.
*G06Q 30/00* (2006.01)

(52) U.S. Cl. .................................. 705/26; 705/1; 705/27

(58) Field of Classification Search .................... 705/26, 705/77, 72, 75, 27; 709/23, 219
See application file for complete search history.

(56) References Cited

U.S. PATENT DOCUMENTS

| | | | | |
|---|---|---|---|---|
| 5,170,466 | A | * 12/1992 | Rogan et al. | 715/530 |
| 5,179,637 | A | 1/1993 | Nardozzi | 395/114 |
| 5,587,740 | A | * 12/1996 | Brennan | 348/373 |
| 5,606,365 | A | 2/1997 | Maurinus et al. | 348/222 |
| 5,696,850 | A | 12/1997 | Parulski et al. | 382/261 |
| 5,748,194 | A | 5/1998 | Chen | 345/427 |
| 5,751,950 | A | 5/1998 | Crisan | 395/188.01 |
| 5,760,916 | A | 6/1998 | Dellert et al. | 358/408 |
| 5,760,917 | A | 6/1998 | Sheridan | 358/442 |
| 5,778,430 | A | 7/1998 | Ish et al. | 711/133 |
| 5,787,459 | A | 7/1998 | Stallmo et al. | 711/112 |

(Continued)

FOREIGN PATENT DOCUMENTS

WO 97/39580 10/1997

(Continued)

OTHER PUBLICATIONS

"Ofoto.com Launches Innovative Photo Finishing Service" PR Newswire (Dec. 13, 1999).*

(Continued)

*Primary Examiner*—Jeffrey A. Smith
*Assistant Examiner*—Michael A. Misiaszek
(74) *Attorney, Agent, or Firm*—Xin Wen (57) ABSTRACT

System and method for collecting customers' images into a kiosk, and transferring images to an image-processing provider for processing. The kiosk includes a computer, a data storage device, an upload port, and an interface for capturing digital images. One method includes accepting image information from a customer into the interface of the kiosk, accepting user-identifier and order information into the kiosk computer, storing a digital representation of the image and associated user-identifier and order information for each customer into a data structure, and sending the data structure to the image-processing provider via the upload port connected to a communication medium such as the internet. Some embodiments also include accepting credit-card payment information, displaying to the customer at least one image from the image information and/or a plurality of thumbnail images from the image information, and/or printing a receipt and/or a printout of thumbnail images from the image information. Optionally, the user specifies a modification to be made to the image information and/or specifies a plurality of delivery addresses. Optionally, the kiosk includes optical scanning of film or prints to generate digital images, transferring image data directly from a digital camera, transferring image data directly from a storage medium, and/or transferring image data into a kiosk data port. Some embodiments include accepting a container of undeveloped film into the kiosk, processing the undeveloped film in the kiosk, and optically scanning the developed film to generate digital representations of the developed film.

62 Claims, 5 Drawing Sheets

U.S. PATENT DOCUMENTS

| | | | |
|---|---|---|---|
| 5,787,466 A | 7/1998 | Berliner | 711/117 |
| 5,790,708 A | 8/1998 | Delean | 382/276 |
| 5,806,005 A | 9/1998 | Hull et al. | 455/566 |
| 5,809,280 A | 9/1998 | Chard et al. | 395/487 |
| 5,835,735 A | 11/1998 | Mason et al. | 395/287 |
| 5,890,213 A | 3/1999 | Sokolov | 711/113 |
| 5,903,728 A | 5/1999 | Semenzato | 395/200.47 |
| 5,907,640 A | 5/1999 | Delean | 382/276 |
| 5,913,088 A | 6/1999 | Moghadam et al. | 396/311 |
| 5,918,213 A | 6/1999 | Bernard et al. | 705/26 |
| 5,926,288 A | 7/1999 | Dellert et al. | 358/487 |
| 5,933,646 A | 8/1999 | Hendrickson et al. | 395/712 |
| 5,960,411 A | 9/1999 | Hartman et al. | 705/26 |
| 6,085,195 A * | 7/2000 | Hoyt et al. | 707/10 |
| 6,369,908 B1 * | 4/2002 | Frey et al. | 358/1.15 |
| 6,554,504 B2 * | 4/2003 | Cook et al. | 396/567 |

FOREIGN PATENT DOCUMENTS

| | | |
|---|---|---|
| WO | 98/36556 | 8/1998 |

OTHER PUBLICATIONS

"Kiosks and Cafes to Wire the Public" Inside Multimedia (Jun. 21, 1999).*

Kendall P. "Curtain up for the photo booth Internet" Daily Mail (Apr. 6, 2000).*

"Kodak Offers Quick Prints Service for Easy Online Ordering of Pictures; Digital camera users can get high-quality prints on photo paper" Business Wire (Aug. 12, 1999).*

* cited by examiner

METHOD AND SYSTEM FOR COLLECTING IMAGES FROM A PLURALITY OF CUSTOMERS

RELATED APPLICATIONS

This invention is related to:

U.S. patent application Ser. No. 09/428,871, entitled "MULTI-TIER DATA STORAGE SYSTEM" filed Oct. 27, 1999, U.S. patent application Ser. No. 09/436,704, entitled "DISTRIBUTING IMAGES TO MULTIPLE RECIPIENTS" filed Oct. 14, 1999, U.S. patent application Ser. No. 09/428,871, entitled "FACILITATING PHOTOGRAPHIC PRINT RE-ORDERING" filed Aug. 31, 1999, U.S. patent application Ser. No. 09/450,804, entitled "IMAGE UPLOADING" filed Nov. 29, 1999, and U.S. patent application Ser. No. 09/550,474, entitled "DIRECT CONNECT IMAGE UPLOAD SYSTEM AND METHOD" filed on Apr. 14, 2000, U.S. patent application Ser. No. 09/550,473, entitled "REMOTE FILM SCANNING AND IMAGE TRANSFER SYSTEM, PROTOCOL AND METHOD" filed on Apr. 14, 2000, which are all assigned to a common assignee, and which are each incorporated herein by reference.

FIELD OF THE INVENTION

This invention relates to the field of automated kiosks for interacting with shoppers and more particularly to a device and method for accepting, storing, and communicating digital images and associated order information and use account information from the kiosk to an online photofinishing provider.

BACKGROUND OF THE INVENTION

The need and demand for transferring image data across a network is rapidly increasing. People have started taking pictures using digital cameras. Processing facilities have begun offering digital scanning services as an optional supplemental service of their conventional film processing operations. For example, a customer can request that their processor provide digitized versions of their film images to be written to a diskette, burned onto a CDROM (compact disk read-only memory), or even e-mailed across the internet or made available on an internet web site for downloading by their friends and relatives.

Digital cameras have declined in price while adding attractive consumer features. As a result digital cameras have become popular with amateur and professional photographers alike. To-date, photographers using digital cameras have faced a variety of expensive options in reproducing their images on paper. Color inkjet printers are available but they require expensive paper for optimal results and are often wasteful of paper. Almost all approaches require, at a minimum, the purchase of a personal computer and the requisite image-processing software.

Recently, companies such as Shutterfly.com of Redwood City, Calif. have provided a web site and software for uploading images captured by a digital camera or scanner. The uploaded images can be processed at the site and turned into high-quality photographic prints. Still, however, the images must be loaded into a personal computer before being transferred to the web site.

Recently, a popular service has arrived which accepts digital image data and writes corresponding images onto photographic paper. The resulting prints are superior in many ways to digital images printed on special coated paper using ink-jet technology. Further services can provide special borders, image effects and color corrections, mailing to selected recipients, and other value-adding services for the image owner.

Further services are being developed to provide other services for digital images, such as converting conventional images (prints or negatives) into a digital format, archiving image data, internet publishing, and delivery of images.

A large number of data formats have been developed over the years for holding image data, such as JPEG joint photographic experts group-type compression format), TIFF (tagged image file format), GIF (graphics interchange format), BMP (bit map format), and other formats. Typically, such formats include a compression format and a data structure definition. An aggregation of images could be held in a directory having a plurality of individual, e.g., JPEG images. However, a mere directory of images lacks organization, indexing, image manipulation information, image ownership information, etc.

Digital images are stored on various media: some are fixed in location (such as hard disks) and others that can be moved or mailed (such as diskettes, DVDs, or CDROMs). Digital images can also be transferred over communications media such as the Internet, local networks, or even a USB (universal serial bus) cable connecting a digital camera to a personal computer. Many different and incompatible protocols and structures have been proposed for transferring and storing images, however a single efficient comprehensive mechanism has not existed.

Uploading of digital images from the camera to an image-processing web site is a time and labor-intensive process. What is needed is a system and method for automating the transfer of images to an image-processing site. At the same time, what is needed is a system and method for reducing the cost and complexity of such a transfer.

SUMMARY OF THE INVENTION

To address the problems stated above, and to solve other problems which will become apparent in reading the specification and claims, a system and method are described for accepting and storing images into a kiosk digital imaging system, and then and then transferring the image data to an image-processing provider.

The present invention provides apparatus and methods for accepting and storing image data from each one of a plurality of customers, for example at a kiosk, then transferring and again storing the digital image data to a central processing facility for processing and distribution per instructions from the customer.

One advantage of the present invention is that the step of accepting and storing image data from a customer can be separated from the step of transferring the image data and order information to the service provider. The customer does not need to wait near the kiosk during the uploading process.

Another advantage of the present invention is that the transfer of the images and order information is secured. The images and the order information from the customer can be temporarily stored over the storage media in the kiosk. The images and order information can be automatically removed from the storage media in the kiosk once the service provided confirms that it has received the image and order information.

The present invention also provides a system and a method for transferring digital images between a kiosk source terminal and a repository system interconnected by a communications medium. For example, in some embodiments, the communications medium includes the Internet. In other embodiments, the medium includes wireless transmission of data. In yet other embodiments, a private network is used.

The present invention provides a method of collecting images from a plurality of customers into a kiosk, and transferring images from the kiosk to an image-processing provider for processing. The kiosk includes a computer, a data storage device and an interface for capturing digital images. The data storage device includes computer-readable media for storing information representative of the digital images. The method includes accepting image information from a customer into the interface of the kiosk, accepting user-identifier information into the computer (the user-identifier information corresponding to the customer), accepting order information into the computer (the order information specifying a service to be provided relative to the image information), storing into a local storage connected to the computer a digital representation of the image information and associated user identifier information and order information for each of a plurality of different customers into a data structure, and sending the data structure to the image-processing provider via a communication medium.

Various embodiments of the method further include accepting credit-card payment information, displaying to the customer at least one image from the image information and/or a plurality of thumbnail images from the image information, and/or printing a receipt describing the order and including a printout of the plurality of thumbnail images from the image information. In some embodiments, the order information further includes a modification to be made to at least one image from the image information and/or a plurality of delivery addresses to which at least one print from the image information is to be delivered. In various embodiments, the accepting image information includes optical scanning of film images and generating digital representations of the film images, transferring image data directly from a digital camera, transferring image data directly from a storage medium, and/or transferring image data into a port such as a universal serial bus (USB) port or wireless port of the kiosk. Some embodiments even include accepting a container of undeveloped film into the kiosk, processing the undeveloped film to generate developed film in the kiosk, and optically scanning the developed film and generating at least one digital representation of the developed film.

Yet another aspect of the present invention provides a kiosk for accepting image-processing orders from a customer for processing at a remote image-processing provider. The kiosk includes a controller, a storage device operatively coupled to the controller, a image input device operatively coupled to the controller, wherein the controller transfers digital image information from the image input device to the storage device, a user input device operatively coupled to the controller to produce user-identifier information and order information based on input from the customer, wherein the order information specifies a service to be provided relative to the image information, and wherein the controller associates the user-identifier information and the order information with the digital image information, and a data transmission interface operatively coupled to the controller and to a communication medium, wherein the controller sends the digital image information and its associated user-identifier information and order information to the image-processing provider via a communication medium.

Yet another aspect of the present invention provides a computer-implemented method of business that includes accepting image information at a first business location, accepting user-identifier information and order information associated with the image information at the first business location, processing and digitally storing a plurality of images from the image information at the first business location, transferring the digital stored images to a second business location across a communications medium, storing the digital images at the second business location, processing prints of the stored images, and delivering the processed prints to a customer.

Another aspect of the present invention provides an automated kiosk for accepting image-processing orders from a customer for processing at a remote image-processing provider. This kiosk includes a controller, a storage device operatively coupled to the controller, a plurality of image input devices operatively coupled to the controller, each input device accepting a different type of image information, wherein the controller transfers digital image information from the image input devices to the storage device, a credit-card reader operatively coupled to the controller, the reader operable to read data of a credit card, a user input device operatively coupled to the controller to produce user-identifier information and order information based on input from the customer, wherein the order information specifies a service to be provided relative to the image information, and wherein the controller associates the user-identifier information and the order information with the digital image information, a display that displays the digital image information, user-identifier information, and order information, and a data transmission interface operatively coupled to the controller and to a communication medium, wherein the controller sends the digital image information and its associated user-identifier information and order information to the image-processing provider via a communication medium.

DESCRIPTION OF PREFERRED EMBODIMENT

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

In the Figures, the same reference number is used throughout to refer to an identical component that appears in multiple Figures. The same reference number or label may refer to signals and connections, and the actual meaning will be clear from its use in the context of the description.

Shutterfly.com Inc. of Redwood City, Calif. provides a number of services such as accepting digital images submitted over the internet, storing such images in a large data storage repository along with indexing, color-correction, configuration, image-manipulation, and/or ownership information correlated to specific images or groups of images.

In some embodiments, the present invention provides a "kiosk" defined as an automated or semi-automated station that interfaces with a customer to accept digital images for processing. In some embodiments, a salesperson can assist the customer in operation of the kiosk.

Figure 1:
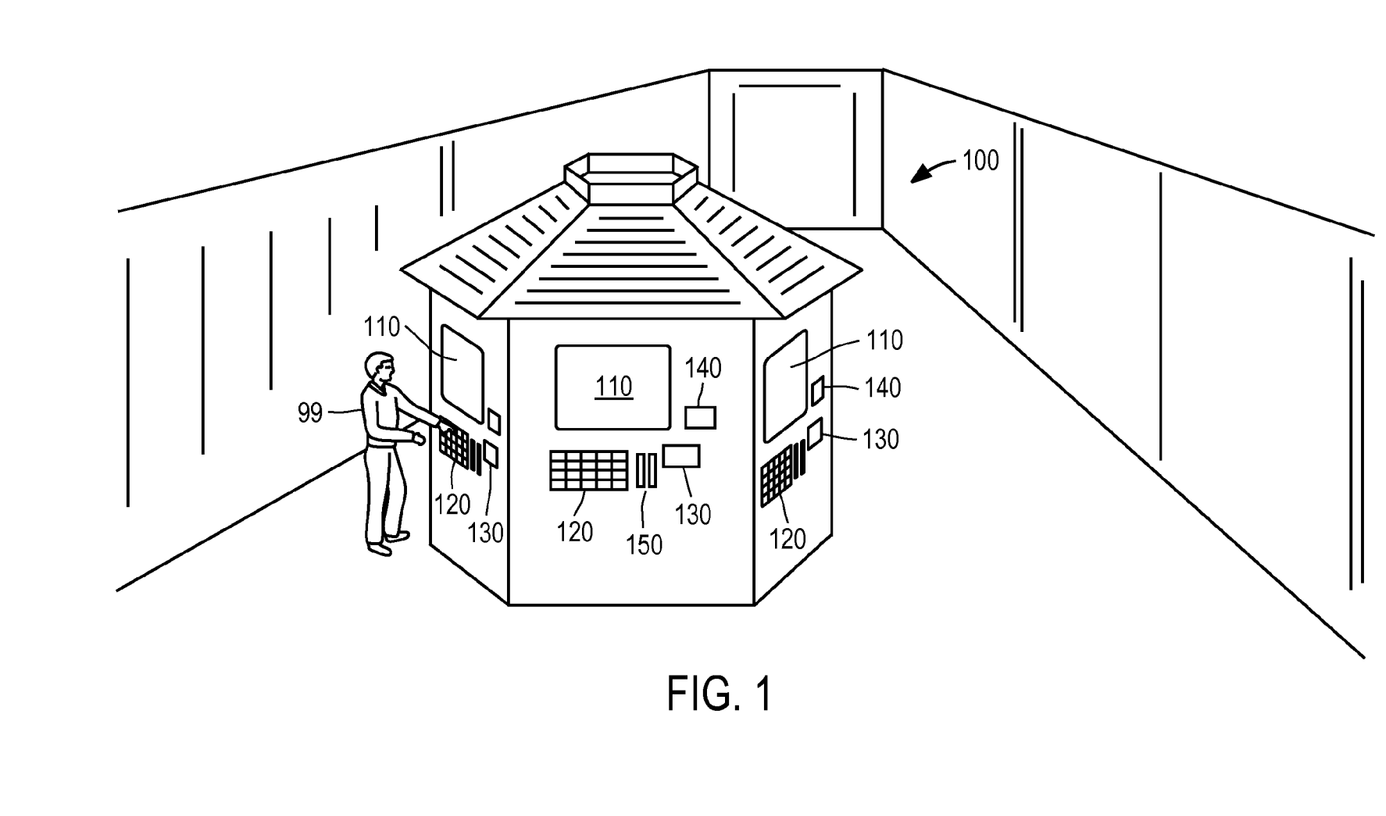
FIG. 1 is a diagram of a kiosk 100 of one embodiment of the present invention.

FIG. 1 is a diagram of a kiosk 100 of one embodiment of the present invention. Kiosk 100 includes one or more user stations 200 (three user stations 200 are shown in this figure). Each user station 200 optionally includes a display 110, user input device 120, image-input device(s) 130 and/or 140, and/or payment input device 150 (i.e., various embodiments include one or more such user-interface components). Some embodiments include a privacy screen 111 to help maintain some confidentiality of the transaction, images and other information. A user or customer 99 would typically input his or her images into the kiosk, enter user-identification information (such as name, address, telephone number, e-mail address, and/or credit card information) into the kiosk, and then order products and/or services based on the images (such as prints, slides, enlargements, photo-CDROMs, e-mailed images, etc.). The kiosk 100 includes local storage 320 within the kiosk or nearby, onto which the image and order information is stored. The kiosk is typically located in a retail store, shopping mall, or other location to make customer access easy and convenient. Some embodiments include a drive-up-window so customers can perform transactions from their car. Typically, information for a plurality of customers 99 is stored, and then uploaded periodically during the day or overnight to a central repository and image-processing facility. That central image-processing facility makes the products or performs the services ordered, and delivers the result to the customer, e.g., by mail. In some embodiments, kiosk 100 is a standalone device on which the customer 99 can use without operator assistance. In other embodiments, the use of kiosk 100 can also involve the assistance of an operator to the customer 99. For example, an operator can help with collecting the payment from the customer 99.

Figure 2:
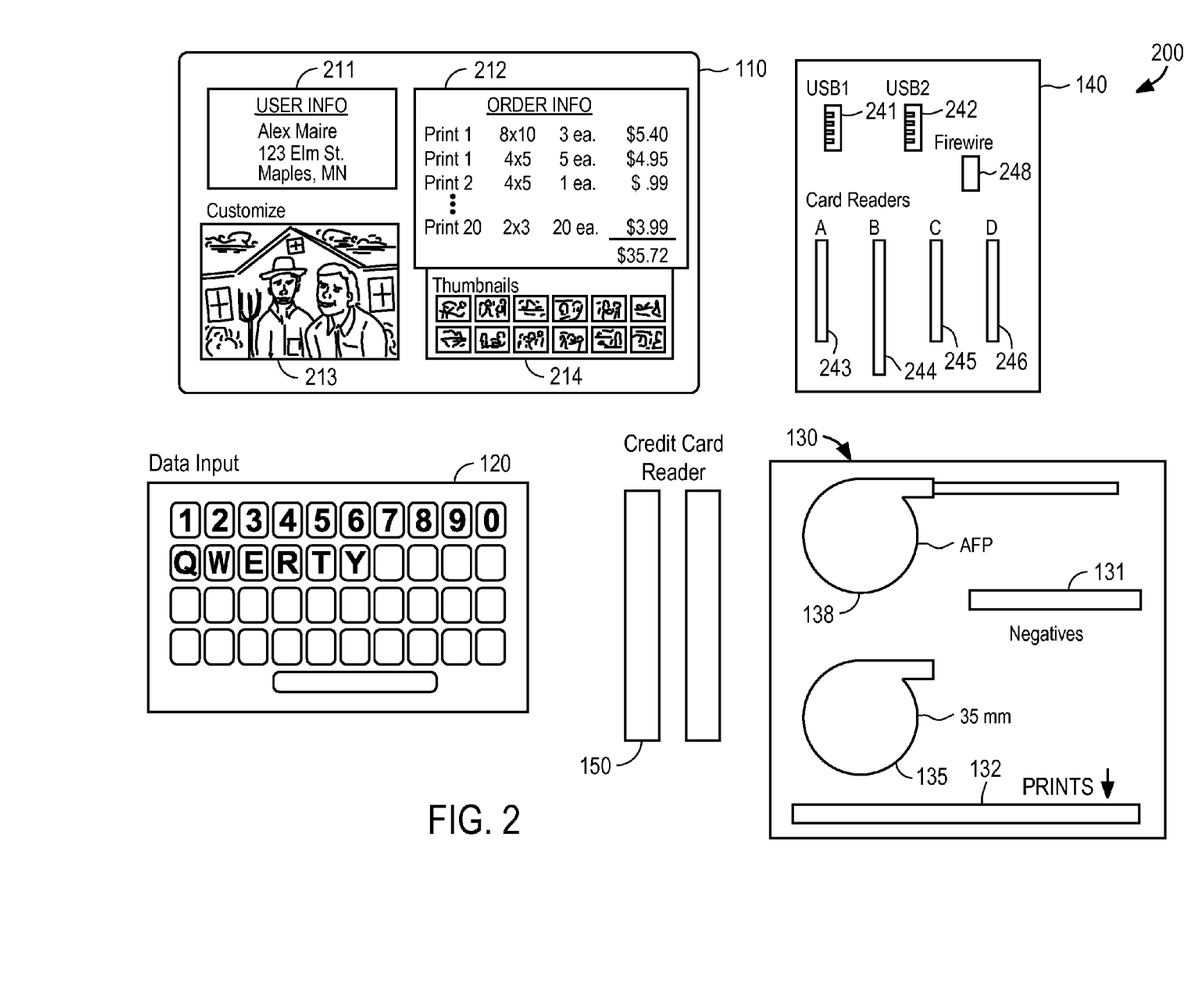
FIG. 2 is a diagram of a kiosk user interface 200 of one embodiment of the present invention.

FIG. 2 is a diagram of a kiosk user interface 200 of one embodiment of the present invention. In some embodiments, user interface 200 includes display 110, user input device 120, image-input device(s) 130 and/or 140, and/or payment input device 150. Display 211 displays such user-identification information as name, address, telephone number, e-mail address, and/or credit-card payment information (for example, the display might show Alex Maire, 123 Elm St, Maples, Minn. 55555, 612-555-1212, danbaum@yahoo.com, MegaBank credit card xxxx xxxx xxxx 0123 charged $35.72). Alternatively, the user-id might just show an arbitrary customer-id number, in order that privacy is maintained. For example, a customer would enter their personal information just once, and thereafter use their customer-id number. In other embodiments, the customer's credit card is scanned by scanner 150 to provide both the customer-id number as well as providing credit information and a way of providing payment. In some embodiments, user data input device 120 (such as a QWERTY-type keyboard or a joystick-type pointing device) is used to input user-identification information. Image input interface 140 includes one or more digital interfaces (such as one or more USB (universal serial bus) ports 241, 242, a firewire-type port 248, storage card readers 243 and 244 of various types, hard-disk readers 245, and/or other data interfaces 246) in order to be able to accept digital image information from user 99. Picture scanning interface 130 provides scanning of film or other images for some embodiments. In some embodiments, undeveloped film canisters or containers (such as advanced file process (AFP) or 35 mm containers) are pushed into openings 138 and 135, whereupon the film is extracted in a dark sealed interior compartment and developed to produce a developed film strip, which is then scanned by a high-resolution digital scanner to generate digital images. In some embodiments, negatives are inserted into slot 131, whereupon the film is optionally cleaned using air blowers and/or solvents, and then scanned by a high-resolution digital scanner to generate digital images. In some embodiments, prints are inserted into slot 132, whereupon the picture is optionally cleaned using air blowers and/or solvents, and then scanned by a high-resolution digital scanner to generate digital images. Other embodiments include other scanners. The images, once entered, are displayed as small "thumbnail" images in window 214 on display 110 in some embodiments. This allows the user 99 to enter order information (e.g., specifying the type, size and number of prints to be made of each image) which is then shown in window 212. In some embodiments, as each successive thumbnail image is highlighted, an enlarged view of that image is shown in window 213. In some embodiments, the user can optionally specify custom modifications to be made to each image (such as cropping, color adjustment, red-eye removal, special borders, etc.). Further, back-print information can optionally be entered, which will be printed on the back of every print and/or just certain prints.

In some embodiments, special delivery instructions can be entered, for example, specifying that a certain number and type and size of prints of certain images are to be mailed to each of a plurality of different addresses (e.g., one print of everything to be mailed to Mom at address 1, two enlargements of print 3 to be mailed to Aunt Maureen at address 2, etc.).

Figure 3:
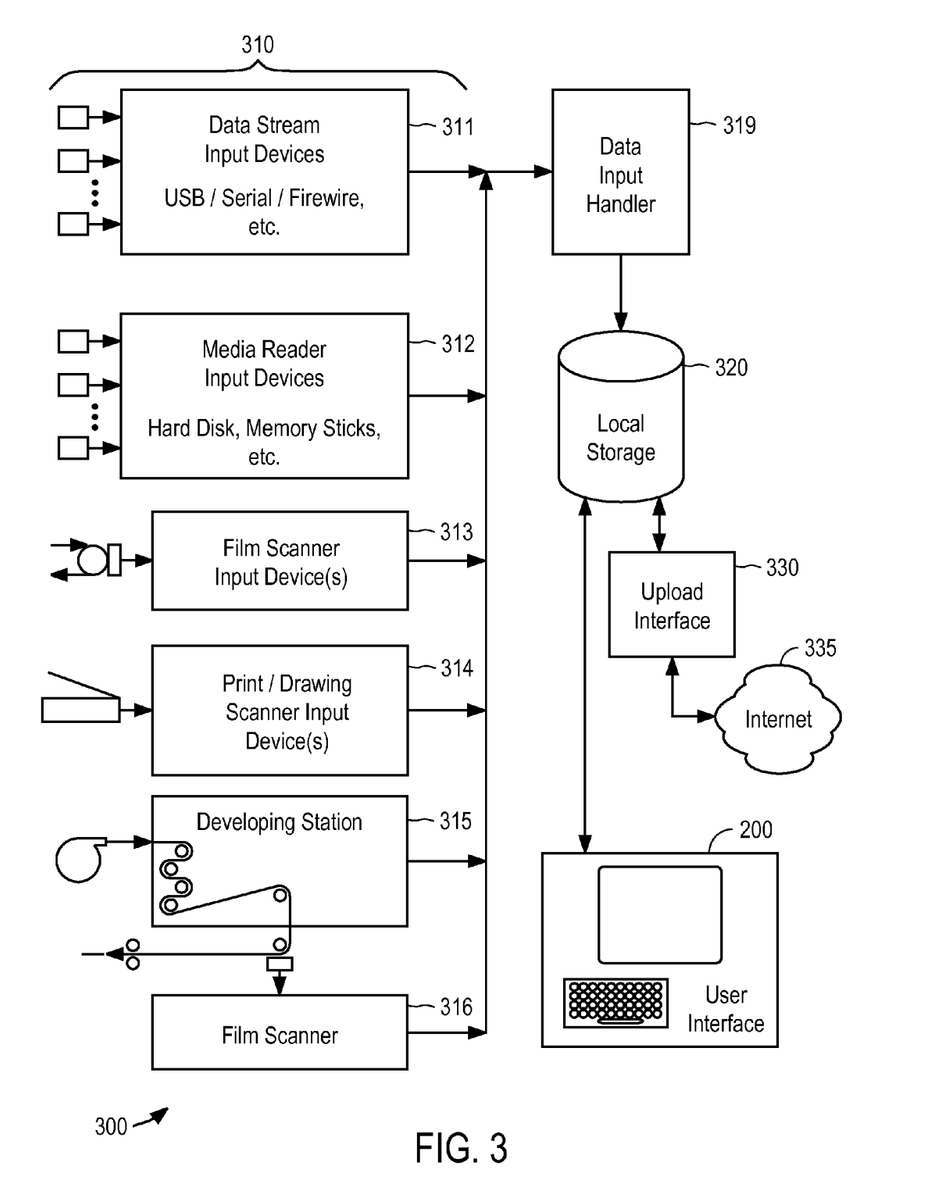
FIG. 3 is a block diagram of a kiosk information handling system 300.

FIG. 3 is a block diagram of a kiosk information handling system 300 of one embodiment. System 300 is embedded in or coupled to kiosk 100. System 300 includes image input ports 310, local storage 320, upload interface 330, and user interface 200. In some embodiments, system 300 includes data stream input devices 311 (for example, a USB port, a serial port, a firewire port and/or a wireless port such as infra-red or 2.4 GHz transmitter/receivers). In some embodiments, each of the one or more data stream input device 311 is configured to receive digital image information from, for example, a digital camera, and to upload such image information to the central processing facility as described below.

In some embodiments, system 300 includes media reader input devices 312 (for example, a SCSI (small computer systems interface) port, memory stick port, EEPROM reader port, diskette reader, etc.). In some embodiments, each media reader input device 312 is configured to receive digital image information from, for example, media for a digital camera or media having downloaded images from a network such as the internet, and to upload such image information to the central processing facility as described below.

In some embodiments, system 300 includes film scanner input devices 313 (for example, a high-resolution film scanner) and/or print/drawing scanner 314 (for example, a flat-bed scanner that emits light on a print placed on the flat-bed surface, and receives reflected light from the print, and digitizes the image). In some embodiments, each film scanner input devices 313 and each print/drawing scanner 314 (if provided) is configured to scan image information from, for example, photographic film or prints. These scanners convert such images into digital image information (i.e., they output a digital image representative of each scanned source image), which is uploaded to the central processing facility as described below.

In some embodiments, system 300 includes a film developing station 315 coupled to pass the developed film to scanner 316. Film developing station 315 is a suitable film processing subsystem, for example, a color film or slide film developing station that automatically removes the undeveloped film from its canister, identifies the type of file, and then processes the film in a process suited to that type of film. Scanner 316 is a suitable high-resolution film scanner.

The digital image information from any of the above-described image input device(s) 310 is stored into local storage 320 by data input handler 319 (in some embodiments, this is a computer). Optionally, user interface 200 displays (for example, on a computer monitor, such as a color CRT or LCD screen) the images and accepts user input as to modifications to the images and the type, size, and number of prints to be made, and the delivery address(es) to which to mail or deliver the prints. Periodically, the upload interface uploads the image and order information across the internet or other suitable network or communications medium (such as wireless or satellite transmission). The timing of the upload can be triggered by any suitable event such as one or more of the following: a polling operation from the central processing facility, or a timer or clock event, or an indication that a certain amount of image information is stored, or that only a certain minimum amount of storage space is remaining. The polling event is a "pull" type transfer wherein the central processing facility controls the timing of the upload to suit its needs. For example, the central processing facility will "ping" (sending an "inquiring signal" to inquire as to whether an image information is available) each kiosk of a set of one or more kiosks. If the kiosk has previously accepted and stored image information that is now available for upload, it will reply with an "image use signal" indicating that image information is available for upload. The central processing facility will then signal how much information to transfer (i.e., indicate how much space is immediately available at its end) and the kiosk uploads that much information (user account information, order information, and image data) and an indication of whether more information is still available for upload. This last step is repeated as many times as needed to transfer all images from the kiosk, or at least as many as can be taken by the central processing facility. In some embodiments, the central processing facility will then indicate to the kiosk that the images have been successfully stored there, and the kiosk then deletes its copies (or otherwise removes the image data from its storage). In some embodiments, the delete permission is sent only after the images have been printed and mailed, in order that the kiosk information can be used as a backup, in case the uploaded information is somehow lost.

Some embodiments of the present invention use a Remote Film Scanning (RFS) applications programming interface (API) and a protocol for transferring digital images (as contained in reel data image structures) from a source to a destination, such as are described in U.S. patent application Ser. No. 09/550,473, entitled "REMOTE FILM SCANNING AND IMAGE TRANSFER SYSTEM, PROTOCOL AND METHOD" filed on Apr. 14, 2000, which is assigned to the assignee, and which is incorporated herein by reference.

The other trigger events described above are "push" type transfer triggers, wherein the kiosk controls the timing of the upload to suit its needs. Some embodiments use a combination of one or more pull- and/or push-type transfer triggers.

The present invention contemplates sources of digital images that, for example, can include a film scanner that scans one or more conventional rolls of photographic negatives or slide film, a paper scanner that scans a paper image or publication, a digital camera having stored digital images, storage media from such a camera, or a portable notebook-type personal computer having a set of stored digital images obtained from, e.g., a digital camera. A roll of conventional photographic film typically includes a plurality of images (e.g., 12, 24, or 36 images are typical, but other numbers of images can be used). In some embodiments, a plurality of such rolls are spliced together into a reel (even rolls from a plurality of different users or customers), in order to facilitate quasi-continuous developing and/or scanning operations. In some such embodiments, a reel will contain about one hundred rolls of film.

Destinations for digital images, for example, can include a central printing facility that exposes conventional light-sensitive color photographic paper to patterns representing the digital image to create photographic prints of the digital images. One exemplary source of digital images is a film-developing-and-scanning facility (a "kiosk") that accepts consumer film rolls for processing, and that transmits resulting digital images across a network (such as the Internet) to the central picture-printing facility. Such a source of digital images can be remote from the central picture-printing facility, and if the remote source is a server connected using an Internet protocol, it is called a "remote web server."

Figure 4:
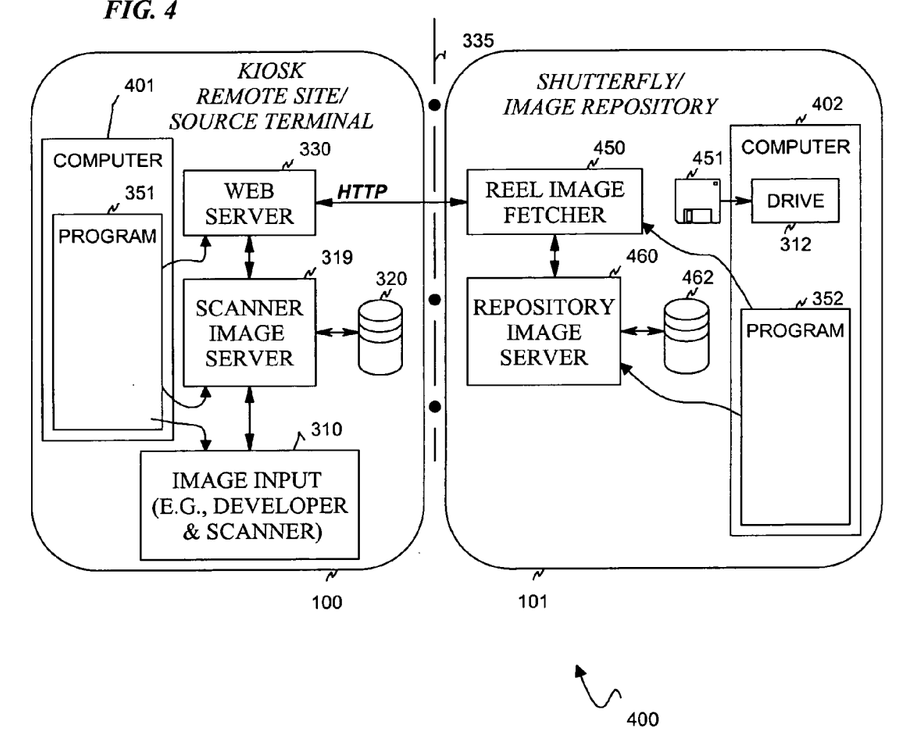
FIG. 4 is a block diagram of a kiosk computer upload system 400.

FIG. 4 is a block diagram of a kiosk computer upload system 400. A computer 401 is used at the source terminal to run a program 351 to control the acquisition of image data and the upload responses, and another computer 402 is used at the reel-fetcher end run another program 352 (which is complementary to the program 351 of the source terminal) to control the polling and storage of the images in the repository. In one embodiment of the present invention, computer system 400 is a system that includes removable-media drive 312 (such as a floppy-disk drive, or a ZIP-type high-capacity drive available from IOMEGA Corporation of Roy, Utah, or a CDROM drive). In one embodiment, removable-media drive 312 is used to read program code 351 and/or 352 from program media 451. Media 451 (such as a floppy disk, a ZIP-type cartridge, or a CDROM) is suitable for a corresponding removable media drive 312. In some embodiments, program code 351 and/or 352 is transferred from a communications medium 335 such as the Internet. In some embodiments, program media 451 is used to distribute program code 351 and/or 352 to customers. In other embodiments, computer 402 is connected to computer network 335 (such as a local-area network (LAN), or a wide-area network such as the Internet). In such a network environment, program code 351 and/or 352 is read from or written to computer network 360. In one such embodiment, computer network 360 is the media used to distribute program code 351 and/or 352 to customers. In some embodiments, program code 351 and/or 352 includes code to load the appropriate reel data image structures to the repository 462.

After the image information, user-identifier information, or the user-identifier information is transferred from the kiosk to image depository at the image processing provider (e.g. online photofinisher), the data structure can be removed from the local storage on the kiosk.

Figure 5:
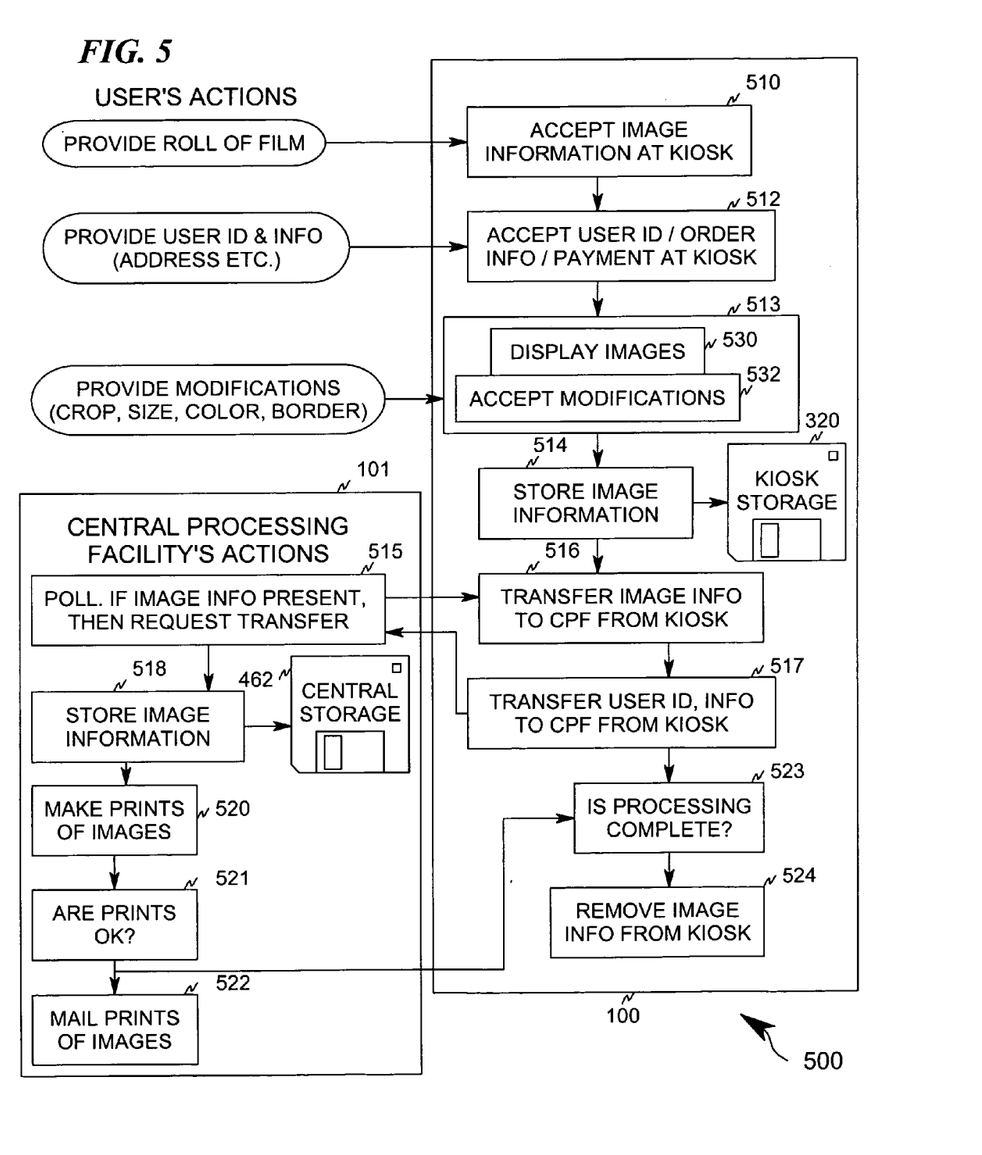
FIG. 5 is a block diagram of a kiosk method 500.

FIG. 5 is a block diagram of a kiosk method 500. This computer-implemented method of business includes, at block 510, accepting image information (provided by a user of the kiosk, for example, a roll of film to be developed, a strip of photographic negatives to be scanned using transmitted light, or a photographic print (or other opaque or printed material) to be scanned using reflected light, or a digital image transferred from a digital camera) at a first business location (for example, at a kiosk 100). At block 512, the method includes accepting user-identifier information and, in some embodiments, order information associated with the image information at the first business location (for example, accepting a customer number into a keypad or a swipe of a magnetically encoded stripe of a user's plastic card, or from a customer keying in name, address, phone number, and how many of what kind of prints to have made). Some embodiments then include a block 513, having subblock 530 (displaying one or more of the images) and/or subblock 532 (modifying one or more of the images). At block 514, the method includes processing and digitally storing a plurality of digital images from the image information at the first business location (e.g., developing the film and scanning the negatives to obtain digital images, or converting from the camera's digital-image format into a high-quality JPEG-type image format, and storing into storage 320 located inside or connected locally to the kiosk). At block 516, the method includes transferring the digital stored images to a second business location across a communications medium (e.g., some embodiments include being polled from block 515 (a poll sent from a central location), and then uploading the digital images across an internet connection). At block 518, the method includes storing the digital images at the second business location (e.g., into a mass storage device at the processing facility). At block 520, the method includes processing 520 prints of the stored images (e.g., making prints of the images onto photographic paper), and block 522 shows delivering the processed prints to a customer (e.g., mailing the prints).

In some embodiments of method 500, an additional block 513 for displaying and/or modifying the images is included. This allows the user to see the raw images, and to customize modifications to the images at the first business location (e.g., the automated kiosk 100). In other embodiments, the user can later access the images (e.g., after step 518, when the images are stored in the central processing facility) from an internet terminal (e.g., from home), and display the images and make modifications and/or customize borders and print sizes for the order (or for an additional subsequent order to the order made at the kiosk at the time the roll of film was originally deposited). In some embodiments, the images are retained in the central processing facility for a long or indefinite period, in order that the customer may make follow-on orders. In some embodiments, such follow-on orders are made at the same kiosk (i.e., using a method otherwise identical to method 500, except that block 510 is omitted, and the user does not provide a roll of film, but instead asks to access the stored images of one or more earlier sessions for reprints).

In some embodiments of the method of business, the first business location of block 510 includes an automated kiosk.

Some embodiments of the method of business further include displaying 530 the images to the customer at the first business location. Some embodiments of the method of business further include accepting 532 input from the customer specifying a modification to be made to at least one image, and displaying 533 a modified image resulting from the modification. Some embodiments of the method of business further include accepting a payment (e.g., as part of block 512 that obtains other information about the user) from the customer into the kiosk. Some embodiments of the method of business further include accepting a credit-card payment (e.g., as part of block 512 that obtains other information about the user) from the customer into the kiosk. Some embodiments of the method of business further include accepting input from the customer (e.g., as part of block 512 that obtains other information about the user) specifying a delivery address for the processed prints. Some embodiments of the method of business further include accepting input from the customer (e.g., as part of block 512 that obtains other information about the user) specifying a plurality of delivery addresses for the processed prints.

Some embodiments of the method of business further include accepting input from the customer specifying at least one delivery address for the processed prints, displaying 530 the images to the customer at the first business location, accepting 532 input from the customer specifying a modification to be made to at least one image, displaying a modified image resulting from the modification, and accepting a payment from the customer into the kiosk.

Some embodiments of the method of business further include transferring a data structure that includes image data of a plurality of customers across an Internet connection within a single Internet session.

In some embodiments, the method further includes removing the data structure (block 524) from the local storage after the data structure has been sent to the image-processing provider. In some embodiments, a check is performed at block 523 (before the data structure is removed) to determine whether processing at the central processing facility 101 is complete, and block 521 at the CPF 101 provides such an indication once it has determined that the prints are acceptable, in order to permit the kiosk 100 to remove or delete the data structure having the images and user information.

Conclusion

The present invention provides a system and a method for transferring digital images between a kiosk source terminal and a repository system interconnected by a communications medium. For example, in some embodiments, the communications medium 140 includes the Internet. In other embodiments, the medium 140 includes wireless transmission of data. In yet other embodiments, a private network 140 is used.

One aspect of the present invention provides a method of collecting images from a plurality of customers into a kiosk 100, and transferring images from the kiosk to an image-processing provider for processing. The kiosk includes a computer, a data storage device and an interface for capturing digital images. The data storage device includes computer-readable media for storing information representative of the digital images. The method includes accepting image information from a customer into the interface of the kiosk, accepting user-identifier information into the computer, the user-identifier information corresponding to the customer, accepting order information into the computer, the order information specifying a service to be provided relative to the image information, storing into a local storage connected to the computer, a digital representation of the image information and associated user identifier information and order information for each of a plurality of different customers into a data structure, and sending the data structure to the image-processing provider via a communication medium.

In some embodiments, the method further includes removing the data structure from the local storage after the data structure has been sent to the image-processing provider.

In some embodiments of the method, the data structure includes a reel-control data structure and a plurality of roll data structures, and the method further includes: in response to receipt of a first poll request at the kiosk and if the data structure is available, sending data structure address information corresponding to the available data structure from the kiosk to the image-processing provider via the communications medium, in response to receipt of the sent data structure address information at the image-processing provider, sending a data-structure-fetch request across the communications medium from the image-processing provider to the kiosk, sending the data structure from the kiosk to the image-pro cessing provider via the communications medium, and storing the data structure in the image-processing provider.

Some embodiments of the method further include accepting credit-card payment information into the computer, and storing into the local storage connected to the computer, a digital representation of the credit-card information associated with the user identifier information. Some embodiments of the method further include displaying to the customer at least one image from the image information. Some embodiments of the method further include displaying to the customer a plurality of thumbnail images from the image information. Some embodiments of the method further include printing a receipt describing the order and including a printout of the plurality of thumbnail images from the image information.

In some embodiments of the method, the order information further includes a modification to be made to at least one image from the image information.

In some embodiments of the method, the order information further includes a plurality of delivery addresses to which at least one print from the image information is to be delivered.

In some embodiments of the method, the accepting image information includes optical scanning of film images and generating digital representations of the film images.

In some embodiments of the method, the accepting image information includes transferring image data directly from a digital camera.

In some embodiments of the method, the accepting image information includes transferring image data directly from a storage medium.

In some embodiments of the method, the accepting image information includes reading image data directly from a memory stick into the kiosk.

In some embodiments of the method, the accepting image information includes reading image data directly from a rotatable storage disk into the kiosk.

In some embodiments of the method, the accepting image information includes transferring image data into a universal serial bus (USB) port of the kiosk.

In some embodiments of the method, the accepting image information includes transferring image data into a wireless receiver port of the kiosk.

In some embodiments of the method, the accepting image information includes: accepting a container of undeveloped film into the kiosk, processing the undeveloped film to generate developed film in the kiosk, and optically scanning the developed film and generating at least one digital representation of the developed film.

Another aspect of the present invention provides a computer-usable information medium having a computer program stored thereon for causing a suitably programmed system to transfer digital images between a source terminal and a repository system interconnected by a communications medium by performing one or more of the methods described above when such program is executed on the system.

Yet another aspect of the present invention provides a kiosk for accepting image-processing orders from a customer for processing at a remote image-processing provider. The kiosk includes a controller, a storage device operatively coupled to the controller, a image input device operatively coupled to the controller, wherein the controller transfers digital image information from the image input device to the storage device, a user input device operatively coupled to the controller to produce user-identifier information and order information based on input from the customer, wherein the order information specifies a service to be provided relative to the image information, and wherein the controller associates the user-identifier information and the order information with the digital image information, and a data transmission interface operatively coupled to the controller and to a communication medium, wherein the controller sends the digital image information and its associated user-identifier information and order information to the image-processing provider via a communication medium.

Some embodiments of the kiosk further include a credit-card information input device operatively coupled to the controller.

Some embodiments of the kiosk further include a display that shows to the customer at least one image from the image information.

In some embodiments of the kiosk, the user input device further accepts input from the customer to specify a modification to be made to at least one image from the image information, and wherein the display provides a visual indication of the image as modified by the modification.

Some embodiments of the kiosk further include a display that shows to the customer a plurality of thumbnail images from the image information.

Some embodiments of the kiosk further include a printer that prints a receipt that describes the order and includes a printout of the plurality of thumbnail images from the image information.

In some embodiments of the kiosk, the user-input device further accepts order information indicating a plurality of delivery addresses to which at least one print from the image information is to be delivered.

In some embodiments of the kiosk, the image-input device includes an optical scanner of film images that generates digital representations of the film images.

In some embodiments of the kiosk, the image-input device includes a digital camera interface that transfers image data directly from a digital camera.

In some embodiments of the kiosk, the image-input device includes a storage medium interface that transfers image data directly from a storage medium.

In some embodiments of the kiosk, the storage medium interface includes a memory stick port into the kiosk.

In some embodiments of the kiosk, the storage medium interface includes a disk interface that reads image data directly from a rotatable storage disk into the kiosk.

In some embodiments of the kiosk, the storage medium interface includes a universal serial bus (USB) port into the kiosk.

In some embodiments of the kiosk, the storage medium interface includes a wireless receiver port into the kiosk.

In some embodiments of the kiosk, the image input device includes: a mechanical port that accepts a container of undeveloped film into the kiosk, a film processor coupled to the mechanical port that processes the undeveloped film to generate developed film in the kiosk, and an optical scanner that scans the developed film and generates at least one digital representation of the developed film.

Still another aspect of the present invention provides a remote film processing system for obtaining digital image data from a customer and remotely processing image prints. This system includes a network, a kiosk coupled to the network, and means for obtaining the digital image data into the kiosk and locally storing the data, and for transferring the data to a repository system interconnected to the kiosk by the network.

Yet another aspect of the present invention provides a computer-implemented method of business that includes accepting image information at a first business location, accepting user-identifier information and order information associated with the image information at the first business location, processing and digitally storing a plurality of images from the image information at the first business location, transferring the digital stored images to a second business location across a communications medium, storing the digital images at the second business location, processing prints of the stored images, and delivering the processed prints to a customer.

In some embodiments of the method of business, the first business location includes an automated kiosk.

Some embodiments of the method of business further include displaying the images to the customer at the first business location.

Some embodiments of the method of business further include accepting input from the customer specifying a modification to be made to at least one image, and displaying a modified image resulting from the modification.

Some embodiments of the method of business further include accepting a payment from the customer into the kiosk.

Some embodiments of the method of business further include accepting a credit-card payment from the customer into the kiosk.

Some embodiments of the method of business further include accepting input from the customer specifying a delivery address for the processed prints.

Some embodiments of the method of business further include accepting input from the customer specifying a plurality of delivery addresses for the processed prints.

Some embodiments of the method of business further include accepting input from the customer specifying at least one delivery address for the processed prints, displaying the images to the customer at the first business location, accepting input from the customer specifying a modification to be made to at least one image, displaying a modified image resulting from the modification, and accepting a payment from the customer into the kiosk.

Some embodiments of the method of business further include transferring a data structure that includes image data of a plurality of customers across an Internet connection within a single Internet session.

Another aspect of the present invention provides an automated kiosk for accepting image-processing orders from a customer for processing at a remote image-processing provider. This kiosk includes a controller, a storage device operatively coupled to the controller, a plurality of image input devices operatively coupled to the controller, each input device accepting a different type of image information, wherein the controller transfers digital image information from the image input devices to the storage device, a credit-card reader operatively coupled to the controller, the reader operable to read data of a credit card, a user input device operatively coupled to the controller to produce user-identifier information and order information based on input from the customer, wherein the order information specifies a service to be provided relative to the image information, and wherein the controller associates the user-identifier information and the order information with the digital image information, a display that displays the digital image information, user-identifier information, and order information, and a data transmission interface operatively coupled to the controller and to a communication medium, wherein the controller sends the digital image information and its associated user-identifier information and order information to the image-processing provider via a communication medium.

Still another aspect of the present invention provides a method of collecting images from a plurality of customers into an image-upload kiosk, and transferring images from the kiosk to an image-processing provider. The kiosk includes a data storage device and an input interface for capturing digital images. The data storage device includes computer readable media for storing information representative of the digital images. The method includes storing image and associated user-identification and order information from each of the plurality of customers into the storage device of the kiosk, connecting the kiosk to a telecommunications channel, and transferring the information over the telecommunications channel from the kiosk to the image-processing provider, wherein transferring the information over the communications channel includes storing the information to a storage device at the image-processing provider.

In some embodiments of this method, the image-upload kiosk includes a receptacle, wherein the storing image and associated user-identification and order information includes removing a data-storage medium from a digital imaging system, and inserting the data-storage medium in the receptacle.

In some embodiments of this method, the image upload kiosk includes a receptacle and a button, wherein storing image and associated user-identification and order information includes removing a data-storage medium from a digital imaging system, inserting the data-storage medium in the receptacle, and depressing the button.

In some embodiments of this method, the telecommunications channel includes a telephone network.

In some embodiments of this method, the image upload kiosk includes a receptacle, and the storing image and associated user-identification and order information further includes removing a data-storage medium from a digital imaging system, inserting the data-storage medium in the receptacle, and wherein transferring the information over the communications channel further includes establishing a telephone connection between the image upload device and the image-processing provider.

In some embodiments of this method, the telecommunications channel includes a cable network.

In some embodiments of this method, the image upload kiosk includes a cradle having a data transfer interface and wherein storing image and associated user-identification and order information includes placing a digital imaging system in the cradle.

In some embodiments of this method, the digital imaging system includes a rechargeable electrical-energy source and the cradle includes a battery-recharge circuit, wherein connecting the data storage device to the image upload device includes recharging the rechargeable electrical-energy source.

Another aspect of the present invention provides a digital image transfer system that includes a processor, memory connected to the processor, a digital imaging system interface connected to the processor, wherein the digital imaging system interface is capable of receiving information representative of digital images from a digital-imaging system, a user interface connected to the processor, the user interface capable of inputting user-identification, order, and payment information from each one of a plurality of customers, a storage device coupled to the processor, that stores the digital images and the associated user-identification and order information, an event detector coupled to the processor, and an image-processing provider interface connected to the processor, wherein the image-processing provider interface is capable of connecting to a communications medium in order to transfer digital images from the digital imaging system interface and the image information and the user-identification and order information from the user interface through the communications medium to an image-processing provider in response to an event detected by the event detector.

In some embodiments of the system, the event detector includes a timer and the event is a time-based event. In some embodiments of the system, the event detector includes an Internet connection and the event is a poll message from the image-processing provider. In some embodiments of the system, the event detector includes a storage space detector and the event is a predetermined amount of image data being stored in the storage device (or, equivalently, only a small amount of unused storage remaining).

Another aspect of the present invention provides a method of collecting images and order information by an image-processing provider from at least one image kiosk. The image kiosk includes a computer, a data storage device and an interface for capturing digital images, wherein the data storage device includes computer readable media for storing information representative of the digital images. This method includes accepting image information from a customer into the interface of the kiosk, storing the image information into a local storage, sending inquiring signal from the image-processing provider to the kiosk, replying the inquiring signal with an image use signal, and transferring the image data to the image-processing provider via a communication medium.

Some embodiments further include removing the image information from the local storage after the image-data transfer.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled. The terms "comprising" and "including" each indicate inclusive groups of elements or steps, and are not intended to exclude other components, integers or steps.

What is claimed is:

1. A method of collecting images from a plurality of customers into a kiosk, and transferring images from the kiosk to an image-processing provider, wherein the kiosk includes a computer, a data storage device and an interface for capturing digital images, wherein the data storage device includes computer readable media for storing information representative of the digital images, the method comprising:

accepting image information from a customer into the interface of the kiosk;

accepting user-identifier information into the computer, the user-identifier information corresponding to the customer;

accepting order information into the computer, the order information specifying a service to be provided relative to the image information;

storing into a local storage connected to the computer, a digital representation of the image information and associated user identifier information and order information for each of a plurality of different customers into a data structure;

in response to receipt of a first poll request at the kiosk and upon detecting the availability of the data structure, sending data structure address information corresponding to the available data structure from the kiosk to the image-processing provider via the communications medium;

in response to receipt of the sent data structure address information at the image-processing provider, sending a data-structure-fetch request across the communications medium from the image-processing provider to the kiosk;

sending the data structure to the image-processing provider via a communication medium, and storing the data structure in the image-processing provider.

2. The method of claim 1 further comprising:

removing the data structure from the local storage after the data structure has been sent to the image-processing provider.

3. The method of claim 1, wherein the data structure includes a reel-control data structure and a plurality of roll data structures.

4. The method of claim 1, further comprising:

accepting credit-card payment information into the computer; and storing into the local storage connected to the computer, a digital representation of the credit-card information associated with the user identifier information.

5. The method of claim 1, further comprising:

displaying to the customer at least one image from the image information.

6. The method of claim 4, further comprising:

displaying to the customer a plurality of thumbnail images from the image information.

7. The method of claim 1, further comprising:

printing a receipt describing the order and including a printout of a plurality of thumbnail images from the image information.

8. The method of claim 1, wherein the order information further includes a modification to be made to at least one image from the image information.

9. The method of claim 1, wherein the order information further includes a plurality of delivery addresses to which at least one print from the image information is to be delivered.

10. The method of claim 1, wherein the accepting image information includes optical scanning of film images and generating digital representations of the film images.

11. The method of claim 1, wherein the accepting image information includes transferring image data directly from a digital-image storage medium.

12. The method of claim, 11, wherein the accepting image information includes reading image data directly from a memory stick into the kiosk.

13. The method of claim 11, wherein the accepting image information includes reading image data directly from a rotatable storage disk into the kiosk.

14. The method of claim 1, wherein the accepting image information includes transferring image data into a universal serial bus (USB) port of the kiosk.

15. The method of claim 1, wherein the accepting image information includes transferring image data into a wireless receiver port of the kiosk.

16. The method of claim 1, wherein the accepting image information includes:

accepting a container of undeveloped film into the kiosk;

processing the undeveloped film to generate developed film in the kiosk; and optically scanning the developed film and generating at least one digital representation of the developed film.

17. A kiosk for accepting image-processing orders from a customer for processing at a remote image-processing provider, the kiosk comprising:

a controller;

a storage device operatively coupled to the controller;

an image input device operatively coupled to the controller, wherein the controller transfers digital image information from the image input device to the storage device;

a user input device operatively coupled to the controller to produce user-identifier information and order information based on input from the customer, wherein the order information specifies a service to be provided relative to the image information, and wherein the controller associates the user-identifier information and the order information with the digital image, information; and a data transmission interface operatively coupled to the controller and to a communication medium, wherein the controller sends the digital image information and its associated user-identifier information and order information to the image-processing provider via a communication medium, wherein in response to receipt of a first poll request at the kiosk and upon detecting the availability of the data structure, the controller sends data structure address information corresponding to the available data structure from the kiosk to the image-processing provider via the communications medium; and in response to receipt of the sent data structure address information at the image-processing provider, the controller sends a data-structure-fetch request across the communications medium from the image-processing provider to the kiosk.

18. The kiosk according to claim 17, further comprising:
a credit-card information input device operatively coupled to the controller.

19. The kiosk according to claim 17, further comprising:
a display that shows to the customer at least one image from the image information.

20. The kiosk according to claim 19, wherein the user input device further accepts input from the customer to specify a modification to be made to at least one image from the image information, and wherein the display provides a visual indication of the image as modified by the modification.

21. The kiosk according to claim 17, further comprising:
a display that shows to the customer a plurality of thumbnail images from the image information.

22. The kiosk according to claim 21, further comprising:
a printer that prints a receipt that describes the order and includes a printout of the plurality of thumbnail images from the image information.

23. The kiosk according to claim 17, wherein the user input device further accepts order information indicating a plurality of delivery addresses to which at least one print from the image information is to be delivered.

24. The kiosk according to claim 17, wherein the image-input device includes an optical scanner of film images that generates digital representations of the film images.

25. The kiosk according to claim 17, wherein the image input device includes a digital camera interface that transfers image data directly from a digital camera.

26. The kiosk according to claim 17, wherein the image input device includes a storage medium interface that transfers image data directly from a storage medium.

27. The kiosk according to claim 26, wherein the storage medium interface includes a memory stick port into the kiosk.

28. The kiosk according to claim 26, wherein the storage medium interface includes a disk interface that reads image data directly from a rotatable storage disk into the kiosk.

29. The kiosk according to claim 26, wherein the storage medium interface includes a universal serial bus (USB) port into the kiosk.

30. The kiosk according to claim 26, wherein the storage medium interface includes a wireless receiver port into the kiosk.

31. The kiosk according to claim 17, wherein the image input device includes:
a mechanical port that accepts a container of undeveloped film into the kiosk;
a film processor coupled to the mechanical port that processes the undeveloped film to generate developed film in the kiosk; and
an optical scanner that scans the developed film and generates at least one digital representation of the developed film.

32. A remote film processing system for obtaining digital image data from a customer and remotely processing image prints, the system comprising:
a network;
a kiosk coupled to the network; and
means for obtaining the digital image data into the kiosk and locally storing the data, and for transferring the data to a repository system interconnected to the kiosk by the network
means, in response to receipt of a first poll request at the kiosk and if a data structure is available, for sending data structure address information corresponding to available data structure from the kiosk via the communications medium; and
in response to receipt of the sent data structure address information at the image-processing provider, sending a data-structure-fetch request across the communications medium to the kiosk.

33. A computer-implemented method of business comprising:
accepting image information at a first business location;
accepting user-identifier information and order information associated with the image information at the first business location;
processing and digitally storing a plurality of images from the image information at the first business location;
accepting payment at the first business location;
transferring the digital stored images to a second business location across a communications medium;
storing the digital images at the second business location;
processing prints of the stored images at the second business location; and
deliver the processed prints to a customer
in response to receipt of a first poll request and if data structure is available, sending data structure address information corresponding to the available data structure via the communications medium; and
in response to receipt of the sent data structure address information at the image-processing provider, sending a data-structure-fetch request across the communications medium.

34. The method according to claim 33, wherein the first business location includes an automated kiosk.

35. The method according to claim 33, further comprising:
displaying the images to the customer at the first business location.

36. The method according to claim 35, further comprising:
accepting input from the customer specifying a modification to be made to at least one image; and
displaying a modified image resulting from the modification.

37. The method according to claim 33, further comprising:
accepting a payment from the customer into the kiosk.

38. The method according to claim 33, further comprising: accepting a credit-card payment from the customer into the kiosk.

39. The method according to claim 33, further comprising: accepting input from the customer specifying a delivery address for the processed prints.

40. The method according to claim 33, further comprising: accepting input from the customer specifying a plurality of delivery addresses for the processed prints.

41. The method according to claim 33, further comprising: accepting input from the customer specifying at least one delivery address for the processed prints;
displaying the images to the customer at the first business location;
accepting input from the customer specifying a modification to be made to at least one image;
displaying a modified image resulting from the modification; and
accepting a payment from the customer into the kiosk.

42. The method according to claim 33, further comprising: transferring a data structure that includes image data of a plurality of customers across an Internet correction within a single Internet session.

43. An automated kiosk for accepting image-processing orders from a customer for processing at a remote image-processing provider, the kiosk comprising:
a controller;
a storage device operatively coupled to the controller;
a plurality of image input devices operatively coupled to the controller, each input device accepting a different type of image information, wherein the controller transfers digital image information from the image input devices to the storage device; a credit-card reader operatively coupled to the controller, the reader operable to read data of a credit card;
a user input device operatively coupled to the controller to produce user-identifier information and order information based on input from the customer, wherein the order information specifies a service to be provided relative to the image information, and wherein the controller associates the user-identifier information and the order information with the digital image information;
a display that displays the digital image information, user-identifier information, and order information; and
a data transmission interface operatively coupled to the controller and to a communication medium, wherein the controller sends the digital image information and its associated user-identifier information and order information to the image-processing provider via a communication medium, wherein in response to receipt of a first poll request at the kiosk and upon detecting the availability of the data structure, the controller sends data structure address information corresponding to the available data structure from the kiosk to the image-processing provider via the communications medium; and in response to receipt of the sent data structure address information at the image-processing provider, the controller sends a data-structure-fetch request across the communications medium from the image-processing provider to the kiosk.

44. A method of collecting images from a plurality of customers into an image-upload kiosk, and transferring images from the kiosk to an image-processing provider, wherein the kiosk includes a data storage device and an input interface for capturing digital images, wherein the data storage device includes computer readable media for storing information representative of the digital images, the method comprising:
storing image and associated user-identification and order information from each of the plurality of customers into the storage device of the kiosk;
connecting the kiosk to a telecommunications channel; and transferring the information over the telecommunications channel from the kiosk to the image-processing provider, wherein transferring the information over the communications channel includes storing the information to a storage device at the image-processing provider;
in response to receipt of a first poll request at the kiosk and upon detecting the availability of the data structure, sending data structure address information corresponding to the available data structure from the kiosk to the image-processing provider via the communications medium; and
in response to receipt of the sent data structure address information at the image-processing provider, sending a data-structure-fetch request across the communications medium from the image-processing provider to the kiosk.

45. The method according to claim 44, wherein the image-upload kiosk includes a receptacle, wherein storing image and associated user-identification and order information includes:
removing a data-storage medium from a digital imaging system; and
inserting the data-storage medium in the receptacle.

46. The method according to claim 44, wherein the image upload kiosk includes a receptacle and a button, wherein storing image and associated user-identification and order information includes:
removing a data-storage medium from a digital imaging system;
inserting the data-storage medium in the receptacle; and
depressing the button.

47. The method according to claim 44, wherein the telecommunications channel includes a telephone network.

48. The method according to claim 47, wherein the image upload kiosk includes a receptacle, wherein storing image and associated user-identification and order information includes:
removing a data-storage medium from a digital imaging system;
inserting the data-storage medium in the receptacle; and
wherein transferring the information over the communications channel further includes establishing a telephone connection between the image upload device and the image-processing provider.

49. The method according to claim 44, wherein the telecommunications channel includes a cable network.

50. The method according to claim 49, wherein the image upload kiosk includes a receptacle, wherein storing image and associated user-identification and order information includes:
removing a data-storage medium from a digital imaging system;
inserting the data-storage medium in the receptacle; and
wherein transferring the information over the communications channel further includes establishing a connection through the cable network between the image upload device and the image-processing provider.

51. The method according to claim 44, wherein the image upload kiosk includes a cradle having a data transfer interface and wherein storing image and associated user-identification and order information includes placing a digital imaging system in the cradle.

52. The method according to claim 51, wherein the digital imaging system includes a rechargeable electrical-energy source and wherein the cradle includes a battery-recharge circuit, wherein connecting the data storage device to the image upload device includes recharging the rechargeable electrical-energy source.

53. The method according to claim 44, wherein the image upload kiosk includes a cradle and a button, wherein storing image and associated user-identification and order information includes placing the digital imaging system in the cradle and depressing the button.

54. The method according to claim 53, wherein the digital imaging system includes a rechargeable electrical-energy source and wherein the cradle includes a battery recharge circuit, wherein connecting the data storage device to the image upload device includes recharging the rechargeable electrical-energy source.

55. A digital image transfer system, comprising:
a processor;
memory connected to the processor;
a digital imaging system interface corrected to the processor, wherein the digital imaging system interface is capable of receiving information representative of digital images from a digital imaging system;
a user interface connected to the processor, the user interface capable of inputting user-identification, order, and payment information from each one of a plurality of customers;
a storage device coupled to the processor, that stores the digital images and the associated user-identification and order information;
an event detector coupled to the processor; and
an image-processing provider interface connected to the processor, wherein the image-processing provider interface is capable of connecting to a communications medium in order to transfer digital images from the digital imaging system interface and the image information and the user-identification and order information from the user interface through the communications medium to an image-processing provider in response to an event detected by the event detector, wherein in response to receipt of a first poll request at the kiosk and upon detecting the availability of the data structure, the processor sends data structure address information corresponding to the available data structure from the kiosk to the image-processing provider via the communications medium; and in response to receipt of the sent data structure address information at the image-processing provider, the processor sends a data-structure-fetch request across the communications medium from the image-processing provider to the kiosk.

56. The system according to claim 55, wherein the event detector includes a timer and wherein the event is a time-based event.

57. The system according to claim 55, wherein the event detector includes an Internet connection and wherein the event is a poll message from the image-processing provider.

58. The system according to claim 55, wherein the event detector includes a storage space detector and wherein the event is a predetermined amount of image data being stored in the storage device.

59. The system according to claim 55, wherein the user interface further includes an image display that displays digital images to the customer.

60. A digital image upload apparatus comprising:
a digital data interface for receiving digital image data, and means, coupled to the interface, for storing and later uploading the digital image data across a communications medium;
means, in response to receipt of a first poll request at the kiosk and if the data structure is available, for sending data structure address information corresponding to the available data structure from the interface via the communications medium; and
means, in response to receipt of the sent data structure address information, for sending a data-structure-fetch request across the communications medium to the interface.

61. A method of collecting images and order information by an image-processing provider from at least one image kiosk, wherein the image kiosk includes a computer, a data storage device and an interface for capturing digital images, wherein the data storage device includes computer readable media for storing information representative of the digital images, the method comprising:
accepting image information from a customer into the interface of the kiosk;
storing the image information into a local storage;
sending inquiring signal from the image-processing provider to the kiosk;
replying the inquiring signal with an image use signal;
transferring the image data to the image-processing provider via a communication medium;
in response to receipt a first poll request at the kiosk and upon detecting the availability of the data structure, sending data structure address information corresponding to the available data structure from the kiosk to the image-processing provider via the communications medium; and
in response to receipt of the sent data structure address information at the image-processing provider, sending a data-structure-fetch request across the communications medium from the image-processing provider to the kiosk.

62. The method of claim 61, further comprising:
removing the image information from the local storage after the image-data transfer.

* * * * *